United States Patent [19]

Giuseppe et al.

[11] Patent Number: 5,473,530
[45] Date of Patent: Dec. 5, 1995

[54] FOUR-QUADRANT PULSE WIDTH MODULATED DC/AC CONVERTER

[75] Inventors: Cimador Giuseppe; Prestifilippo Paolo, both of Palermo, Italy

[73] Assignee: Italtel Societa Italiana Telecomunicazione s.p.a., Milan, Italy

[21] Appl. No.: 39,111

[22] PCT Filed: Oct. 12, 1991

[86] PCT No.: PCT/EP91/01961

§ 371 Date: Apr. 14, 1993

§ 102(e) Date: Jun. 14, 1993

[87] PCT Pub. No.: WO92/07418

PCT Pub. Date: Apr. 30, 1992

[30] Foreign Application Priority Data

Oct. 19, 1990 [IT] Italy .................................. 21805 A/90

[51] Int. Cl.⁶ .................................................. H02M 7/537
[52] U.S. Cl. ........................... 363/131; 363/8; 363/134
[58] Field of Search ............................. 363/8, 124, 131, 363/134, 163, 164

[56] References Cited

U.S. PATENT DOCUMENTS

| | | | |
|---|---|---|---|
| 3,517,300 | 6/1970 | McMurray | 363/25 |
| 4,213,173 | 7/1980 | Link et al. | 363/163 |
| 4,479,175 | 10/1984 | Gille et al. | 363/41 |
| 4,763,237 | 8/1988 | Wieczorek | 363/20 |
| 4,772,994 | 9/1988 | Harada et al. | 363/8 |

FOREIGN PATENT DOCUMENTS 8202134  6/1982  WIPO .............................. H02M 7/42

Primary Examiner—Jeffrey L. Sterrett

[57] ABSTRACT

A pulse width modulated DC/AC converter includes an input circuit galvanically insulated from an output circuit. The input circuit includes two branches connected in parallel to a pair of input terminals which receive a direct current voltage. Each branch includes an inductor, and a bidirectional switching element which may include a transistor in parallel with a diode. The output circuit has a similar configuration with the addition of two filtering capacitors connected across the output terminals. The converter has a wide range of applications, such as a ringing generator in a telephone system, an emergency supply for a computer system, or as a driving stage for a AC motor.

16 Claims, 4 Drawing Sheets

FOUR-QUADRANT PULSE WIDTH MODULATED DC/AC CONVERTER

BACKGROUND OF THE INVENTION

The present invention refers to a DC/AC converter, that is a device able to convert a DC generator into an AC one, in particular the type having galvanic insulation between input and output.

The subject of the invention can be employed in a wide range of applications, among which the one of ringing generator for telephone systems, as emergency supply for computer systems or as driving stage for AC motor.

To convert direct current, e.g. supplied by a battery, into alternate current (preferably sinusoidal) several topologies are known. Some topologies have several disadvantages, such as for instance considerable weight and overall dimensions, or a high output distortion.

In particular, the most advanced DC/AC converter includes a high frequency PWM converter stage with galvanic insulation which is controlled by a sinusoidal voltage. It also includes a compensation network and a transistorized full-bridge. In this converter, the first stage does not generate a direct voltage, but a rectified sinewave. The second stage (full-bridge) allows to extract the sinewave and working at low frequency it is able to get high efficiency. Unfortunately this converter requires in practice two stages and an additional compensation network to allow proper operation on reactive load.

Another DC/AC topology uses a full bridge PWM stage followed by a low frequency transformer, but the efficiency figure obtainable at relatively low input voltage is poor.

WO 82/02134 discloses a DC/AC converter suitable for producing an alternating output voltage on a load in accordance with the preamble of claim 1. However according to such prior art device a sinusoidal waveform is reconstructed in four time intervals under control of bidirectional switches that connect the converter branches one after the other in correspondence of the zero-current crossing. This device requires complex control means since a pair of precisely timed control signals is requested for each bidirectional switch to prevent discontinuities in the generated waveform, and moreover such timing is dependent from the load.

SUMMARY OF THE INVENTION

The purpose of this invention is to obtain a new converter that eliminates the disadvantages described above and in particular having reduced weight and volume, high efficiency, and low complexity.

These purposes are obtained with the invention which consists in a DC/AC converter suitable for producing an alternating output voltage on a load connected between two output terminals of an output circuit galvanically insulated from an input circuit having two input terminals connected to a direct current source, said input circuit comprising:

a first inductor and first switching means connected in series to said input terminals;

a second inductor and second switching means connected in series to said input terminals;

said output circuit comprising:

a third inductor and third switching means connected to said load through filter means;

a fourth inductor and fourth switching means connected to said load through filter means;

said first and third inductors being magnetically coupled together and said second and fourth inductors being magnetically coupled together, the converter further including means to generate control signals for said switching means;

characterized by the fact that said third inductor and switching means and said fourth inductor and switching means are connected to the output terminals in a differential manner, with a pair of capacitors connected between the common node of the differential connection, and one terminal of the load, and that each of said switching means comprises a unidirectional semiconductor switch parallely connected with a diode, the control electrodes of said first and third semiconductor switches and those of said second and fourth semiconductor switches receiving from said control means signals that are out of phase by 180°, respectively.

The converter according to the invention is applied, preferably but not limited to, powers lower than 1 kVA.

BRIEF DESCRIPTION OF THE DRAWINGS

The invention shall now be described more in detail making reference to preferred but not limiting realization forms, shown in the figures enclosed where.

DESCRIPTION OF THE PREFERRED EMBODIMENTS

Figure 1:
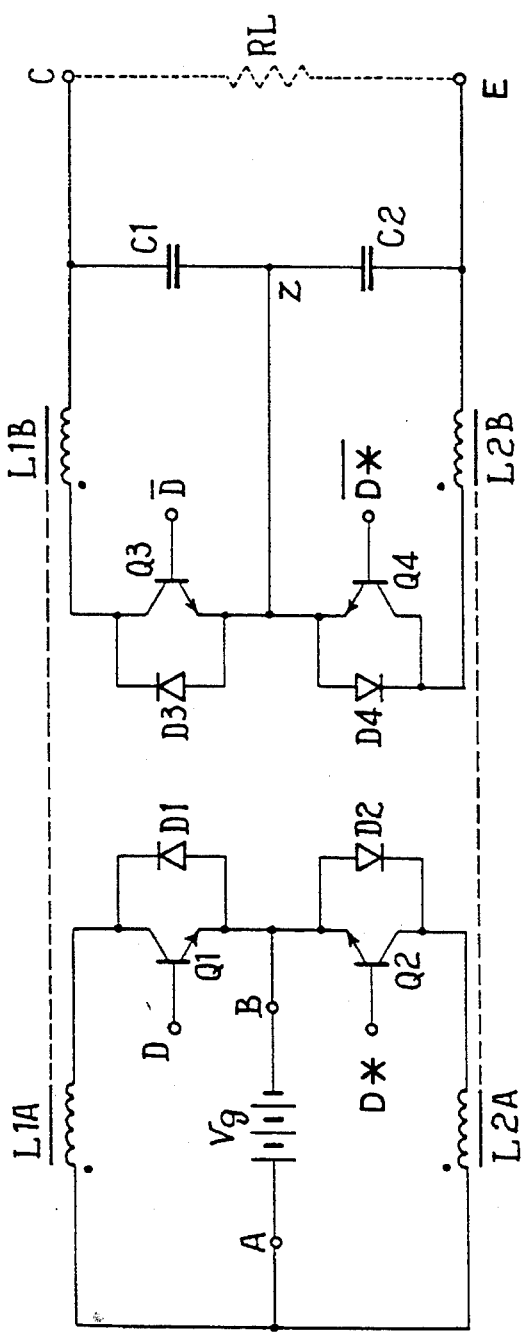
FIG. 1 shows a general block diagram of a DC/AC converter according to the invention.

As illustrated in the general outline in FIG. 1, the converter device according to the invention includes two input terminals A, B, supplied by a Vg voltage, and two output terminals C, E, supplying a load RL, whose characteristics shall be furtherly described.

Vg voltage is the direct current (DC) generator supying the converter and this power source can be represented for instance by a battery.

The device includes an input circuit and an output circuit galvanically insulated between them, which shall be described here below.

The input circuit includes two branches connected in parallel to terminals A, B, each one formed by an inductor and by a bidirectional switching element, schematically represented with a transistor with a corresponding diode connected in parallel among the terminals of collector and emitter. More particularly, the input circuit includes a first inductor L1A in series to a transistor Q1 with diode D1, while the second branch includes a second inductor L2A in series to a second transistor Q2 with diode D2 in parallel.

The output circuit has a partially similar structure foreseeing however a positioning in series formed by a third inductor L1B, by a third transistor Q3 (with associated diode D3), by a fourth transistor Q4 (with associated diode D4), and by a fourth inductor L2B. This serial arrangement is connected in parallel to output terminals C, E. Furthermore, in parallel to these terminals two capacitors C1 and C2 are foressen, connected in series between them and having the common node Z connected to the common node formed by transistors Q3 and Q4.

As it can be noticed in FIG. 1, inductors L1A and L1B are magnetically coupled, e.g. through a winding on a common magnetic core, usually ferrite, and inductors L2A and L2B are they too magnetically coupled on a additional common magnetic core, it too usually ferrite made. Closing of transistor Q1, or of transistor Q2, enables the current supplied by the Vg source in inductor L1A, L2A respectively, which accumulates power in the magnetic field. This power is then transferred to the load RL through the two branches of the output circuit.

The scheme described can be considered as formed by four converters of the type known as PWM "flyback" which actually allow the realization of a four-scale converter.

Always referring to FIG. 1, the four elementary converters are identified by the following components:

1) Vg, L1A, Q1, D3, C1
2) Vg, L2A, Q2, D4, C2
3) C1, L1B, Q3, D1, Vg
4) C2, L2B, Q4, D2, Vg.

Branches 1) and 3) are required for the construction of the positive half-wave on load R, while branches 2) and 4) for the construction of the negative half-wave.

The four transistors or more in general bidirectional switching semiconductor devices, indicated with Q1, Q2, Q3 and Q4 are driven with signals of the pulse type, in order that each one of them can assume two operation states and more in detail an OFF state and a ON state.

In the OFF state, the switching element shows a very high impedance, not allowing the current to pass through its terminals, typically the transistor results interdicted and there is no current circulation between the collector and the emitter.

In the ON state, the switching element has a very low impedance allowing the current to pass through its terminals, typically in the case of a transistor, this one is in a saturation state.

During operation, particularly as for the positive half-wave, the closing of transistor Q1 allows the circulation of a current supplied by the Vg source in inductor L1A which accumulates power in the magnetic field.

The voltage pulse occurring on inductor L1B at opening of transistor Q1 is rectified by diode D3. It is thus obtained a growing voltage applied at the RL load, such to reconstruct the positive half-wave on the load itself.

The capacitor C1 performs the double function of filter for high frequency components (switching frequency) and of power accumulation. During the rated operation, a voltage is present at its ends, referred to the common point Z of the two capacitors C1 and C2, consisting of a continuous component and of an alternate component. The alternate component is supplied on the RL load to reconstruct the positive half-wave of the sinusoid, while the continuous component is generally stored in the capacity and is used for power recovery necessary during the operation on the reactive load.

During the operation with reactive load, closing of Q3 takes place so to be able to store power on the magnetic element L1B at the expenses of the power stored on the capacitor C1.

At opening of Q3, the diode D1 allows to recover the power in excess on the reactive load which is transferred to the battery Vg as direct current.

Components of branches 2) and 4) cover functions identical to those described above, but as for the construction of the negative half-wave, and therefore they shall not be described furtherly.

Figure 2:
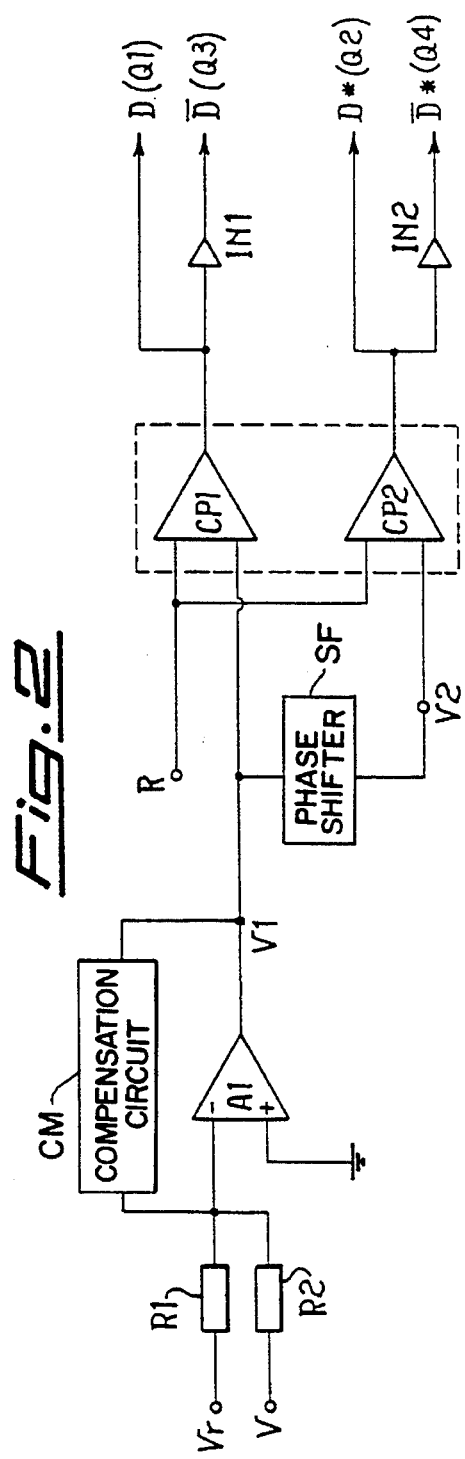
FIG. 2 gives the outline of the driving circuit.
Figure 3:
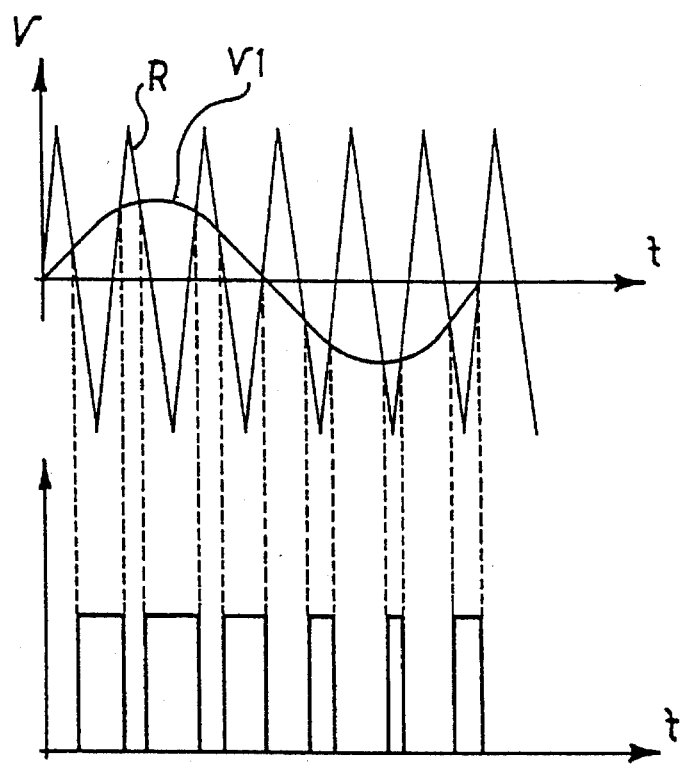
FIG. 3 shows driving signals of Q1 and Q3 transistors.
Figure 4:
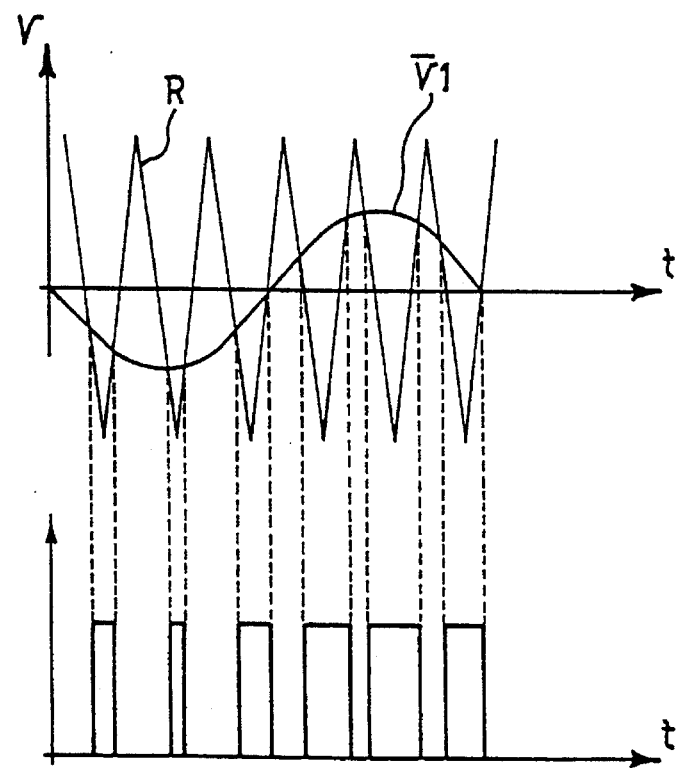
FIG. 4 shows driving signals of Q2 and Q4 transistors.

Referring to FIGS. 2, 3 and 4, in particular, we now describe the control pulse signals and their construction. More in detail, the circuit in FIG. 2 generates control pulses which are sent to the four switches Q1–Q4.

These pulses have a constant or fixed frequency in all operation conditions, defined as conversion frequency. On the contrary, the duration results variable, that is the transition moment between a state and the subsequent one, and this variable duration is called duty cycle. A logic state "0", or a logic state "1" can be associated to pulses, so that it is possible to use Boolean algebra to easily describe relations among them. The control pulse of Q1 shall be hereafter used as reference, defining by D the time (of cycle) during which it remains at logic level "1". Therefore D is lower than one unit and (1−D) indicates that the control pulse on transistor Q1 is at logic level "0".

The transistor Q1 is therefore driven by the signal D, while the transistor Q2 is driven with a signal obtained from a modulating signal shifted 180° out of phase. Similarily, the transistor Q3 is driven by an inverted signal compared to the driving signal of Q1, and Q4 is driven by an inverted signal compared to the driving signal of Q2. These signals are identified D, D, D* and D*, respectively.

Modulation pulses D illustrated in FIG. 3 are obtained by comparison between a voltage signal V1 called modulating signal and a triangular shaped signal R called carrier, this last having a frequency much higher than the one of the first signal. As shown in FIG. 2, the modulating signal Vl is obtained from the difference, in an error amplifier A1, between a reference signal Vr and the output voltage V from the conversion link. These voltage are withdrawn through resistences R1 and R2 and the output of the operational amplifier A1 is connected to the inverting input through a compensation circuit CM.

In particular, driving signals of Q1 and Q3 are obtained taking at the input of a first comparator CP1 the sinusoid V1 and the ramp R. At the comparator CP1 output we have then the pulses for Q1 driving. Through an inverter IN1 driving pulses D for transistor Q3 are obtained.

Driving signals for Q2 and Q4 are obtained by comparing a signal V2 (obtained from V1 through a 180° phase shifter SF) with the ramp R in a second comparator CP2. The output of comparator CP2 directly supplies the transistor Q2, while the transistor Q4 is supplied through an inverter IN2. Driving pulses for Q2 and their construction are shown in FIG. 4, while driving pulses for Q4 have not been illustrated since they can be easily obtained from the previous ones.

Figure 5A:
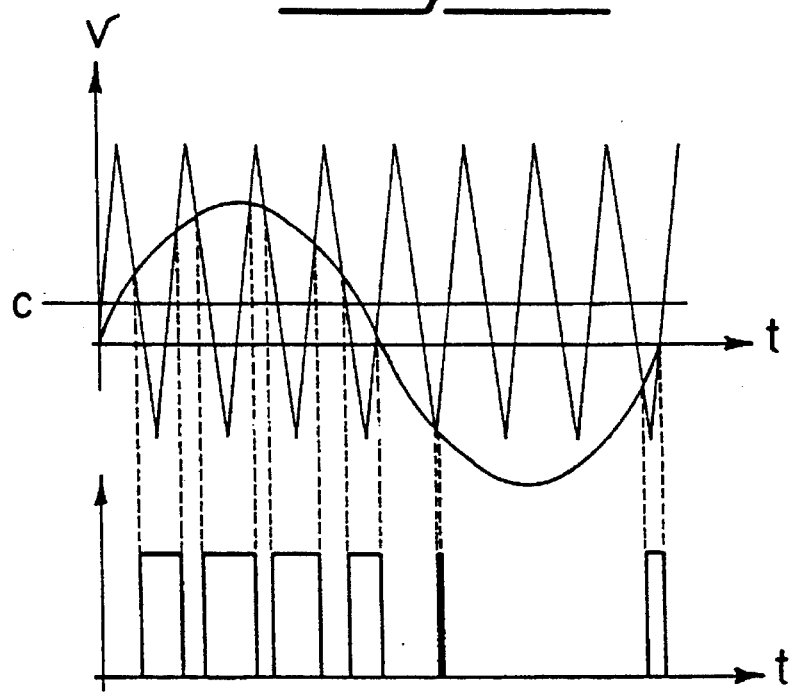
FIGS. 5A and 5B show a variant of driving signals.
Figure 5B:
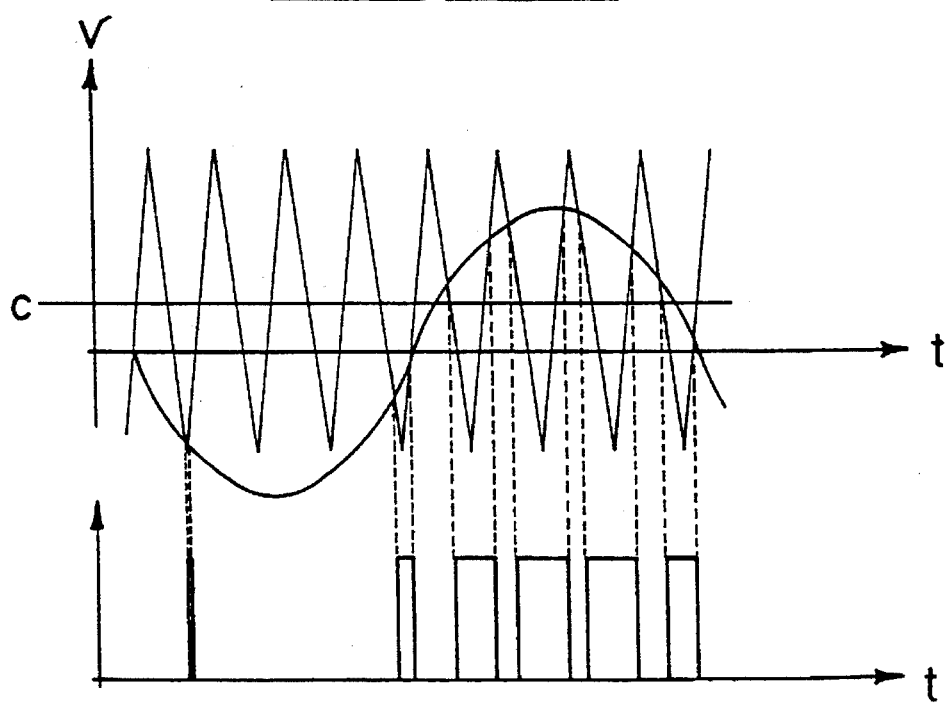

According to an alternative realization form in FIGS. 5A and 5B, the conversion efficiency can be increased using driving pulses obtained by adding a positive direct current (C) to the ramp R. In this way transistors are automatically turned off with an angle of the modulating signal depending on the constant level (C) added to the ramp. The relevant driving signals for Q1 (and for Q3 after the inversion) are illustrated in FIG. 5A, while those for Q2 (and after inversion for Q4) are shown in FIG. 5B.

Figure 6:
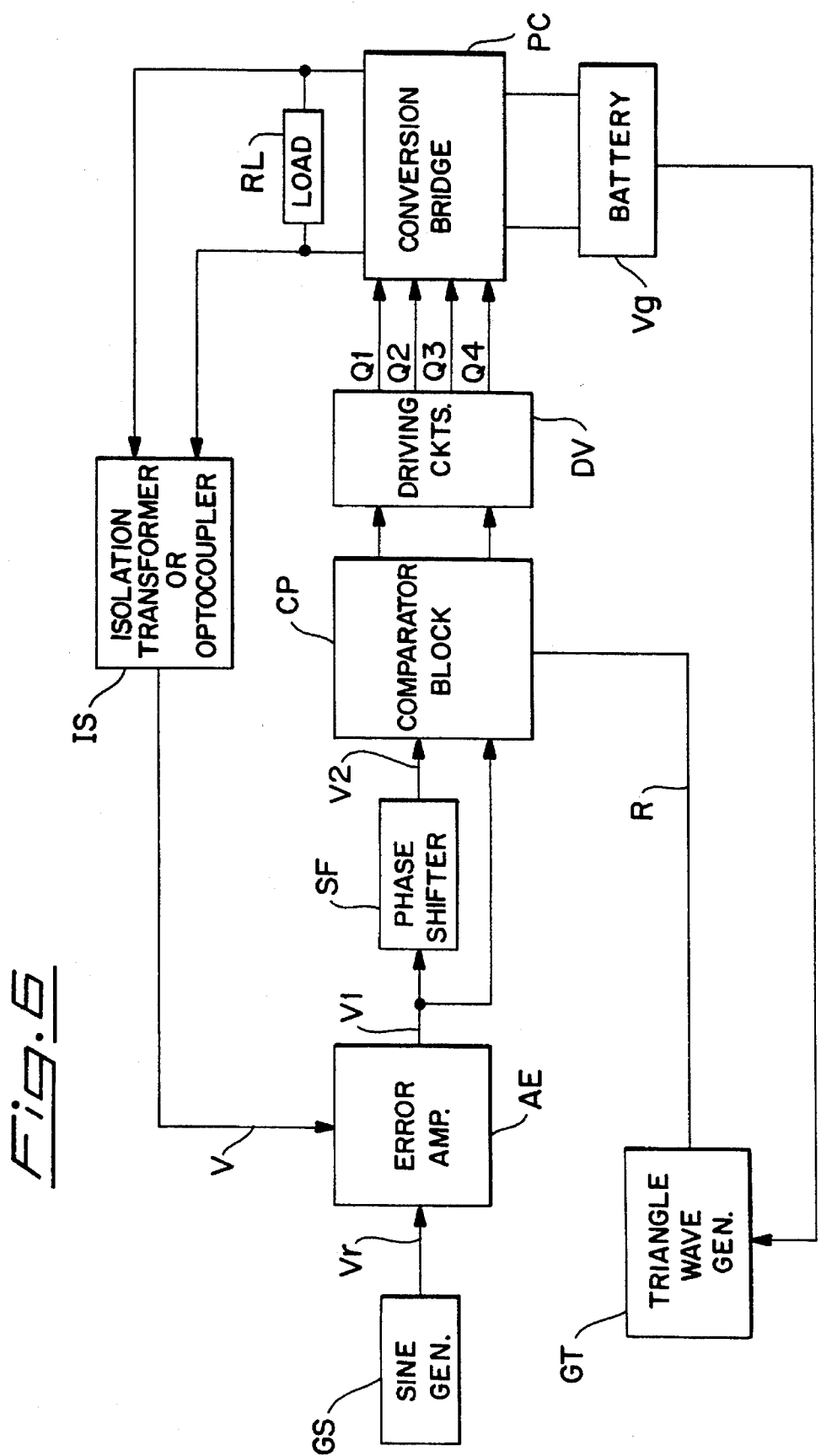
FIG. 6 shows the application of the converter according to the invention to a call pulse generator.

Making reference to FIG. 6 it shall now be illustrated an application of the DC/AC converter according to the invention in a tone generator (or ringing generator) for application in the telephone field.

The core of the device is made of a converter of the type shown in FIGS. 1 and 2, including a conversion bridge PC, supplied by a battery Vg, which in its turn supplies a load RL consisting in this case of a bell or other suitable sound warning.

The bridge PC is controlled by pulse signals D, D, D* and D* for the four transistors or switches Q1, Q2, Q3, Q4 which are generated by a comparator block CP and a 180° phase shifter. Driving circuits or drivers DV are foreseen to supply the required driving power.

The device includes also a reference sine generator GS capable to supply a sine signal Vr having steady width in the time and with temperature, whose output is connected to an error amplifer circuit AE. The ramp signal R is supplied by the triangular waver generator circuit GT, receiving also the voltage from battery Vg in order to create a triangular voltage associated to the battery one.

The output signal generated by the conversion bridge is taken to the AE circuit through an isolation component IS. The IS component can be,for instance an isolation transformer, of small dimensions since it has not to transfer power, but only information, in particular the wave shape coming out from the conversion bridge PC. As an alternative the IS component can be implemented through an optocoupler.

The block AE determines the difference between the reference signal and the signal coming out from the conversion bridge to control the width and the distortion of the sinusoid coming out through the negative retroaction circuit. The block AE includes also, preferably, the necessary compensation circuits and elements to assure the stability of the whole system.

Contrarily to the previous known technique, the converter according to the invention employs a single conversion stage to perform the desired inversion, and maintains high efficiency without the need to use a low frequency transformer to obtain the insulation between input and output. In fact, the converter according to the invention, intrisecally foresees the galvanic insulation and it is not therefore necessary to introduce an insulation transformer neither high frequency nor low frequency ones.

Since the converter according to the invention does not include low frequency operating components, it has extremely reduced weight and volume, high efficiency and furthermore the output frequency and voltage can be continuously adjusted within a wide-range, with no output power derating.

Since it is necessary to obtain a voltage inversion on the load, it is foreseen that the duty cycle D varies according to sine law around a static value equal to 0.5 in correspondence of a nul modulating signal, that is:

$$D=0.5+A \sin wt=0.5+\delta$$

where $A<0.5$ and $w$ is the frequency of the modulating signal.

In the case that A is relatively small, the output voltage can be approximated as $V=8Vg\cdot\delta$.

Hence, it can be noticed that by changing the duty cycle with sine law, even the output results sinusoidal, unless odd harmonics are present, essentially due to the non linearity of the converter static characteristic.

By using a negative feedback it is possible to obtain a considerable reduction (of at least one decade), of the total harmonic distortion, acceptable for a tone generator. Distortion increases as the modulating signal amplitude increases. However, this does not represent a valid limit for the circuit operation. Since it is possible to operate with an increased turn ratio of the two inductors it is possible to increase the output voltage without increasing the modulation coefficient from which the harmonic distortion depends.

We claim:

1. A DC/AC converter for supplying an alternating output voltage to a load comprising:

an input circuit having two input terminals connected to a direct current source;

an output circuit having a pair of output terminals connected across the load and being galvanically insulated from said input circuit;

said input circuit including,
   a first inductor and first switching means connected in series across said input terminals;
   a second conductor and second switching means connected in series across said input terminals;

said output circuit including:
   a third inductor and third switching means connected to said load through filter means;
   a fourth inductor and fourth switching means connected to said load through filter means;

said first and third inductors being magnetically coupled together and said second and fourth inductors being magnetically coupled together;

said third inductor and switching means, and said fourth inductor and switching means being connected to the output terminals;

said filter means being connected between the output terminals and a common node connecting said third and fourth switching means;

each of said switching means comprising a unidirectional semiconductor switch connected in parallel with a diode, the control electrodes of said first and third semiconductor switches and the control electrodes of said second and fourth semiconductor switches receiving from said control means signals that are out of phase by 180°, respectively.

2. The converter according to claim 1, wherein said means for generating the control signals for the first and third switching means includes a first comparator supplied at one input by a modulating signal and at the other input by a ramp signal, having a frequency much higher than that of the modulating signal, and a first inverter connected to the output of said first comparator.

3. The converter according to claim 2, wherein said means for generating the control signals for the second and fourth switching means includes a second comparator supplied at one input by said modulating signal 180° phase shifted, and at the other input by said ramp signal having a frequency much higher than the modulating signal, and a second inverter connected to the output of said second comparator.

4. The converter according to claim 2, wherein a constant continuous component is superimposed to said ramp signal.

5. The converter according to claim 1, further comprising a reference sine wave generator, whose output is connected to an error amplifier circuit, the error amplifier circuit also receiving the output signal present on the load through an isolating component.

6. The converter according to claim 5, wherein said isolating component is an isolation transformer.

7. The converter according to claim 5, wherein the isolating component is an optocoupler.

8. The converter according to claim 7, further comprises a triangular wave generator circuit producing a ramp voltage, with a superimposed constant voltage, linked to the direct current source.

9. A DC/AC call signal generator for supplying an alternating output voltage to a load comprising:

an input circuit having two input terminals connected to a direct current source;

an output circuit having a pair of output terminals connected across the load and being galvanically insulated from said input circuit;

said input circuit comprising:

a first inductor and first switching means connected in series across said input terminals, a second inductor and second switching means connected in series across said input terminals, said output circuit comprising, a third inductor and third switching means connected to said load through filter means, a fourth inductor and fourth switching means connected to said load through filter means;

said first and third inductors being magnetically coupled together and said second and fourth inductors being magnetically coupled together, the call signal generator further comprising means for generating control signals for said switching means;

said third inductor and switching means and said fourth inductor and switching means being connected to the output terminals, said filter means being connected between the output terminals and a common node connecting said third and fourth switching means;

each of said switching means comprising a unidirectional semiconductor switch connected in parallel with a diode, the control electrodes of said first and third semiconductor switches and the control electrodes of said second and fourth semiconductor switches receiving from said control means signals that are out of phase by 180°, respectively.

10. The call signal generator according to claim 9, wherein said means for generating the control signals for the first and third switching means includes a first comparator supplied at one input by a modulating signal and at the other input by a ramp signal having a frequency much higher than that of the modulating signal, and a first inverter connected to the output of said first comparator.

11. The call signal generator according to claim 10, wherein said means for generating the control signals for the second and fourth switching means includes a second comparator supplied at one input by said modulating signal 180° phase shifted, and at the other input by said ramp signal having a frequency much higher than the modulating signal, and a second inverter connected to the output of said second comparator.

12. The call signal generator according to claim 10, wherein a constant continuous component is superimposed to said ramp signal.

13. The call signal generator according to claim 9, further comprising a reference sine stabilized generator, whose output is connected to an error amplifier circuit, the error amplifier circuit receiving also the output signal present on the load through an isolating component.

14. The call signal generator according to claim 13, wherein said isolating component is an isolation transformer.

15. The call signal generator according to claim 13, wherein the isolating component is an optocoupler.

16. The call signal generator to claim 15, further comprising a triangular wave generator circuit producing a ramp voltage, with a superimposed constant voltage, linked to the direct current source.

* * * * *

UNITED STATES PATENT AND TRADEMARK OFFICE
CERTIFICATE OF CORRECTION

PATENT NO. : 5,473,530
DATED : December 5, 1995
INVENTOR(S) : Giuseppe CIMADOR; Paolo PRESTIFILIPPO It is certified that error appears in the above-indentified patent and that said Letters Patent is hereby corrected as shown below:

On the title page, item [86], the "section 371 date" should be changed to June 14, 1993.

Signed and Sealed this

Eighteenth Day of June, 1996

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,473,530
DATED : December 5, 1995
INVENTOR(S) : Giuseppe CIMADOR; Paolo PRESTIFILIPPO It is certified that error appears in the above-indentified patent and that said Letters Patent is hereby corrected as shown below:

Title page, item [19], should read --Cimador et al--
item [75], should appear as follows:

Giuseppe CIMADOR
Paolo PRESTIFILIPPO

Signed and Sealed this

Thirteenth Day of August, 1996

Attest:

BRUCE LEHMAN

*Attesting Officer*     *Commissioner of Patents and Trademarks*